United States Patent
English et al.

(10) Patent No.: US 10,621,219 B2
(45) Date of Patent: *Apr. 14, 2020

(54) TECHNIQUES FOR DETERMINING A SEMANTIC DISTANCE BETWEEN SUBJECTS

(71) Applicant: INTERNATIONAL BUSINESS MACHINES CORPORATION, Armonk, NY (US)

(72) Inventors: Jennifer Ann English, Redwood City, CA (US); Malous Melissa Kossarian, San Mateo, CA (US); Charles E. McManis, Jr., Santa Clara, CA (US); Douglas A. Smith, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 151 days.

This patent is subject to a terminal disclaimer.

(21) Appl. No.: 15/430,185

(22) Filed: Feb. 10, 2017

(65) Prior Publication Data

US 2018/0232437 A1    Aug. 16, 2018

(51) Int. Cl.
*G06F 16/33* (2019.01)
*G06N 20/00* (2019.01)
(Continued)

(52) U.S. Cl.
CPC ........ *G06F 16/3344* (2019.01); *G06F 16/313* (2019.01); *G06F 16/3347* (2019.01);
(Continued)

(58) Field of Classification Search
CPC ............. G06F 16/3344; G06F 16/3347; G06F 16/313; G06F 17/2785; G06F 17/2818; G06N 20/00

See application file for complete search history.

(56) References Cited

U.S. PATENT DOCUMENTS 6,460,034 B1 * 10/2002 Wical .................... G06F 16/334
8,499,051 B2    7/2013 Pocklington
(Continued)

FOREIGN PATENT DOCUMENTS

CN    105243152    1/2016

OTHER PUBLICATIONS

Qin, Z., Thint, M., & Huang, Z. (2009). Ranking answers by hierarchical topic models. In Next-Generation Applied Intelligence (pp. 103-112). Springer Berlin Heidelberg.
Lee, S., Baker, J., Song, J., & Wetherbe, J. C. (Jan. 2010). An empirical comparison of four text mining methods. In System Sciences (HICSS), 2010 43rd Hawaii International.
(Continued)

*Primary Examiner* — Robert W Beausoliel, Jr.
*Assistant Examiner* — Hau Hoang
(74) *Attorney, Agent, or Firm* — Michael R. Long; Diana R. Gerhardt

(57) ABSTRACT

A technique for calculating a semantic distance between subjects includes performing a mathematical operation between each of one or more first topic vectors and each of one or more second topic vectors to generate respective strength values. The first topic vectors are associated with respective first topics of a first subject, the second topic vectors are associated with respective second topics of a second subject, and the respective strength values are indicative of a relative closeness between associated ones of the first and second topics. Relevant ones of the respective strength values are summed to provide an overall strength value between the first subject and the second subject. A semantic distance between the first subject and the second subject is determined based on the overall strength value.

12 Claims, 8 Drawing Sheets

(51) Int. Cl.
  *G06F 16/31* (2019.01)
  *G06F 17/27* (2006.01)
  *G06N 7/00* (2006.01)
  *G06F 17/28* (2006.01)

(52) U.S. Cl.
  CPC ...... *G06F 17/2785* (2013.01); *G06F 17/2818* (2013.01); *G06N 7/005* (2013.01); *G06N 20/00* (2019.01)

(56) References Cited

U.S. PATENT DOCUMENTS

| | | |
|---|---|---|
| 9,135,242 B1 | 9/2015 | Wang et al. |
| 10,146,874 B2 | 12/2018 | Wang et al. |
| 10,394,956 B2 | 8/2019 | Zeng et al. |
| 2015/0286709 A1* | 10/2015 | Sathish .................. G06N 7/005 706/52 |
| 2018/0113933 A1 | 4/2018 | Lewis et al. |
| 2018/0260490 A1 | 9/2018 | Shi |

OTHER PUBLICATIONS

Taramigkou, M., Bothos, E., Christidis, K., Apostolou, D., & Mentzas, G. (Oct. 2013). Escape the bubble: Guided exploration of music preferences for serendipity and novelty.

Christidis, K., Mentzas, G., & Apostolou, D. (2012). Using latent topics to enhance search and recommendation in Enterprise Social Software. Expert Systems with Applications.

David Newman, Jey Han Lau, Karl Grieser, and Timothy Baldwin. 2010. Automatic evaluation of topic coherence. In Human Language Technologies: The 2010 Annual Conference.

Asli Celikyilmaz, Dilek Hakkani-Tur, and Gokhan Tur. 2010. LDA based similarity modeling for question answering. In Proceedings of the NAACL HLT 2010 Workshop on Semantic Sear.

Bian, J., Jiang, Z., & Chen, Q. (Aug. 2014). Research on Multi-document Summarization Based on LDA Topic Model. In Intelligent Human-Machine Systems and Cybernetics (IHMSC).

English et al. U.S. Appl. No. 15/626,809, filed Jun. 19, 2017, Non-Final Office Action dated Jul. 30, 2019.

\* cited by examiner

TECHNIQUES FOR DETERMINING A SEMANTIC DISTANCE BETWEEN SUBJECTS

This application is related to U.S. patent application Ser. No. 15/430,214, entitled "TECHNIQUES FOR ANSWERING QUESTIONS BASED ON SEMANTIC DISTANCES BETWEEN SUBJECTS," by Jennifer Ann English et al., filed on Feb. 10, 2017, the disclosure of which is hereby incorporated herein by reference in its entirety for all purposes.

BACKGROUND

The present disclosure is generally directed to techniques for determining a semantic distance between subjects and, more specifically, to techniques for determining a semantic distance between subjects, at least one of which may be associated with user input to a data processing system, such as a question answering system.

Watson is a question answering (QA) system (i.e., a data processing system) that applies advanced natural language processing (NLP), information retrieval, knowledge representation, automated reasoning, and machine learning technologies to the field of open domain question answering. In general, conventional document search technology receives a keyword query and returns a list of documents, ranked in order of relevance to the query (often based on popularity and page ranking). In contrast, QA technology receives a question expressed in a natural language, seeks to understand the question in greater detail than document search technology, and returns a precise answer to the question.

The Watson system reportedly employs more than one-hundred different algorithms to analyze natural language, identify sources, find and generate hypotheses, find and score evidence, and merge and rank hypotheses. The Watson system implements DeepQA™ software and the Apache™ unstructured information management architecture (UIMA) framework. Software for the Watson system is written in various languages, including Java, C++, and Prolog, and runs on the SUSE™ Linux Enterprise Server 11 operating system using the Apache Hadoop™ framework to provide distributed computing. As is known, Apache Hadoop is an open-source software framework for storage and large-scale processing of datasets on clusters of commodity hardware.

The Watson system employs DeepQA software to generate hypotheses, gather evidence (data), and analyze the gathered data. The Watson system is workload optimized and integrates massively parallel POWER7® processors. The Watson system includes a cluster of ninety IBM Power 750 servers, each of which includes a 3.5 GHz POWER7 eight core processor, with four threads per core. In total, the Watson system has 2,880 POWER7 processor cores and has 16 terabytes of random access memory (RAM). Reportedly, the Watson system can process 500 gigabytes, the equivalent of one million books per second. Sources of information for the Watson system include encyclopedias, dictionaries, thesauri, newswire articles, and literary works. The Watson system also uses databases, taxonomies, and ontologies.

Cognitive systems learn and interact naturally with people to extend what either a human or a machine could do on their own. Cognitive systems help human experts make better decisions by penetrating the complexity of 'Big Data'. Cognitive systems build knowledge and learn a domain (i.e., language and terminology, processes and preferred methods of interacting) over time. Unlike conventional expert systems, which have required rules to be hard coded into an expert system by a human expert, cognitive systems can process natural language and unstructured data and learn by experience, similar to how humans learn. While cognitive systems have deep domain expertise, instead of replacing human experts, cognitive systems act as a decision support system to help human experts make better decisions based on the best available data in various areas (e.g., healthcare, finance, or customer service).

A latent Dirichlet allocation (LDA) is a statistical model utilized in NLP to allow sets of observations to be explained. For example, if observations are words collected into documents, LDA assumes that each document is a mixture of a number of topics and that the creation of words in a document are attributable to one of the topics. For example, a topic may be identified using supervised labeling and/or manual pruning. An LDA analysis may be employed to classify a document based on words in the document. As one example, a document about cats has a relatively high probability of including various cat-related words, e.g., 'milk', 'meow', 'kitten', and 'cat'. As another example, a document about dogs has a relatively high probability of including dog-related words, e.g., 'puppy', 'bark', 'bone', and 'dog'.

BRIEF SUMMARY

Disclosed are a method, a data processing system, and a computer program product (embodied in a computer-readable storage device) for determining a semantic distance between subjects.

A technique for determining a semantic distance between subjects includes performing a mathematical operation between each of one or more first topic vectors and each of one or more second topic vectors to generate respective strength values. The first topic vectors are associated with respective first topics of a first subject, the second topic vectors are associated with respective second topics of a second subject, and the respective strength values are indicative of a relative closeness between associated ones of the first and second topics. Relevant ones of the respective strength values are summed to provide an overall strength value between the first subject and the second subject. A semantic distance between the first subject and the second subject is determined based on the overall strength value.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
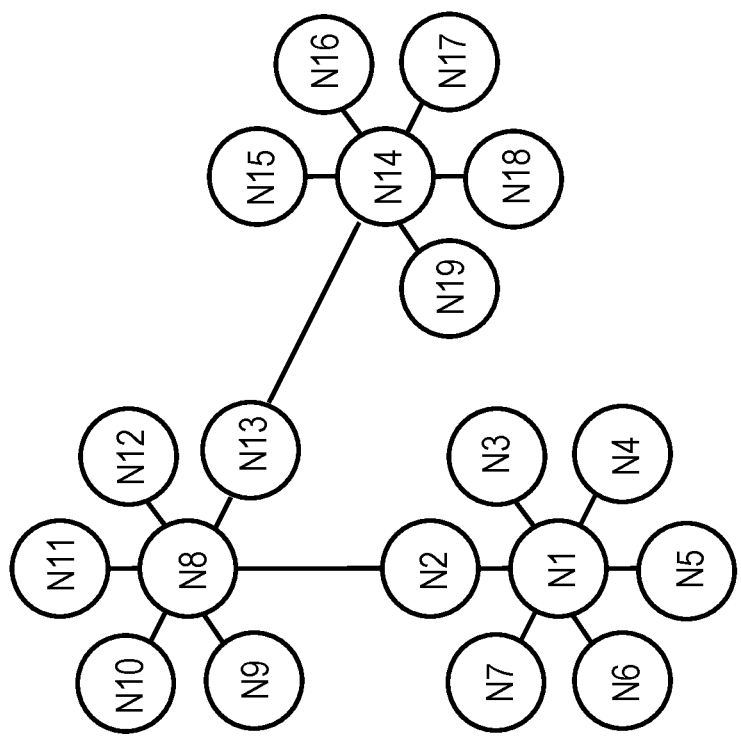
FIG. 1 is a diagram of an exemplary high performance computing (HPC) cluster that includes a number of nodes, with one or more of the nodes including multiple processors that are configured to function as a question answering (QA) system, according to various aspects of the present disclosure.

The illustrative embodiments provide a method, a data processing system, and a computer program product (embodied in a computer-readable storage device) for determining a semantic distance between subjects.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices. As used herein, the terms 'data' and 'evidence' are interchangeable. As used herein, the term 'computer-readable storage device' is synonymous with the term 'computer readable storage medium'.

Assuming that data can be readily understood, there are many applications in which learning from unstructured natural language is possible. Search engines are known, e.g., the Blekko™ Web search engine, that have derived a set of around two-thousand different subjects that exist on the Internet (e.g., in the form of Web pages) and cover most topics of general interest. The subjects have been defined within the search engine using slashtags' to refine search results. The subjects vary from general areas (e.g., history, cars, travel, and hotels) to more specific subjects (e.g., renaissance dance and bed bugs). To facilitate automatically determining how 'close' a given subject is to any other given subject, it would be desirable to be able to calculate a semantic distance between subjects. As one example, the closeness of subjects may be used to provide additional information in response to a query about a subject from other very close subjects and/or to locate subject clusters within a flat list of all subjects. According to one conventional approach, a latent Dirichlet allocation (LDA) analysis has been utilized to generate topic vectors for document classification, with semantic distances between classified documents being calculated based on the generated topic vectors.

LDA analysis has been used to classify unstructured natural language to a specific subject with an accuracy of about thirty-five percent in determining a correct subject out of nearly two-thousand subjects and with an accuracy of about sixty-five percent in determining a correct subject in the top five subjects. In general, approaches that classify unstructured natural language to a specific subject have been based on a set of documents from various Web sites that have been a priori manually classified. As previously mentioned, LDA analysis generates a set of topic vectors for each subject that includes words indicative of a subject, along with a normalized strength value for each of the words. The number of topic vectors for a given subject depends on the amount of text used in each analysis, e.g., some subjects may only have ten to twenty topic vectors while other subjects may have hundreds or thousands of topic vectors.

In one or more embodiments of the present disclosure, a statistical model (e.g., LDA) is employed on general subjects to generate topic vectors for each of the subjects. The topic vectors are then utilized to determine respective semantic distances between the subjects. According to one or more aspects of the present disclosure, a semantic distance may be defined between general subjects associated with any document on the Web. The strengths of the topic vectors can be used, for example, to generate respective semantic distance values between each subject in use on the Web. The distance values may then be utilized to populate a semantic distance matrix (e.g., a semantic distance matrix with 2000 by 2000 elements) that may be utilized to increase the usefulness of a classification. For example, if a user has a specific subject of interest, e.g., the 'Denver Broncos', a classification may have an accuracy of thirty-five percent for that exact text. According to an embodiment of the present disclosure, a user may specify a 'threshold distance value' on the classification to return pages with information that is closely related to the 'Denver Broncos', such as pages with information related to the 'NFL', 'football', and/or 'sports'. Assuming that the threshold distance value used to locate similar subjects is not too large, pages directed to unrelated subjects, e.g., 'health' or 'cancer', are not returned. It should be appreciated that in data processing systems that do not utilize semantic distance information between subjects the ability to provide related and useful information about a given subject may be severely limited.

According to the present disclosure, a data processing system is configured to utilize topic vectors associated with different subjects, that are derived from LDA analysis of the different subjects, to determine an overall semantic distance value between each of the different subjects. As one example, the different subjects may correspond to existing subjects defined for Blekko™ searching. For example, a distance matrix for all general use subjects for Web content may be generated that facilitates determining when a given subject is close to another subject and may be used to provide useful additional information for searching or document matching.

Conventionally, the Watson system has explored relatively large amounts of structured and unstructured data to find candidate answers for a question (or a problem). According to various aspects of the present disclosure, techniques for performing high performance computing (HPC), or network computing, are described herein that facilitate determining a first subject of a question (or problem) received by a question answering system and then determining a semantic distance between the first subject and one or more second subjects. In the event that one or more of the second subjects is within a threshold distance value of the first subject, a new question may be generated by modifying the received question (or problem), e.g., with the first subject being replaced with the second subject, to locate additional data from which additional candidate answers can be generated for the question (or problem). With reference to FIG. 1, an example topology for a relevant portion of an exemplary HPC cluster (supercomputer) 100 includes a number of nodes (N1-N18) that are connected in, for example, a three-dimensional (3D) Torus topology. Each of the nodes (N1-N18) may include one or more symmetric multiprocessors (SMPs). While eighteen nodes are illustrated in FIG. 1, it should be appreciated that more or less than eighteen nodes may be present in an HPC cluster configured according to the present disclosure.

Figure 2:
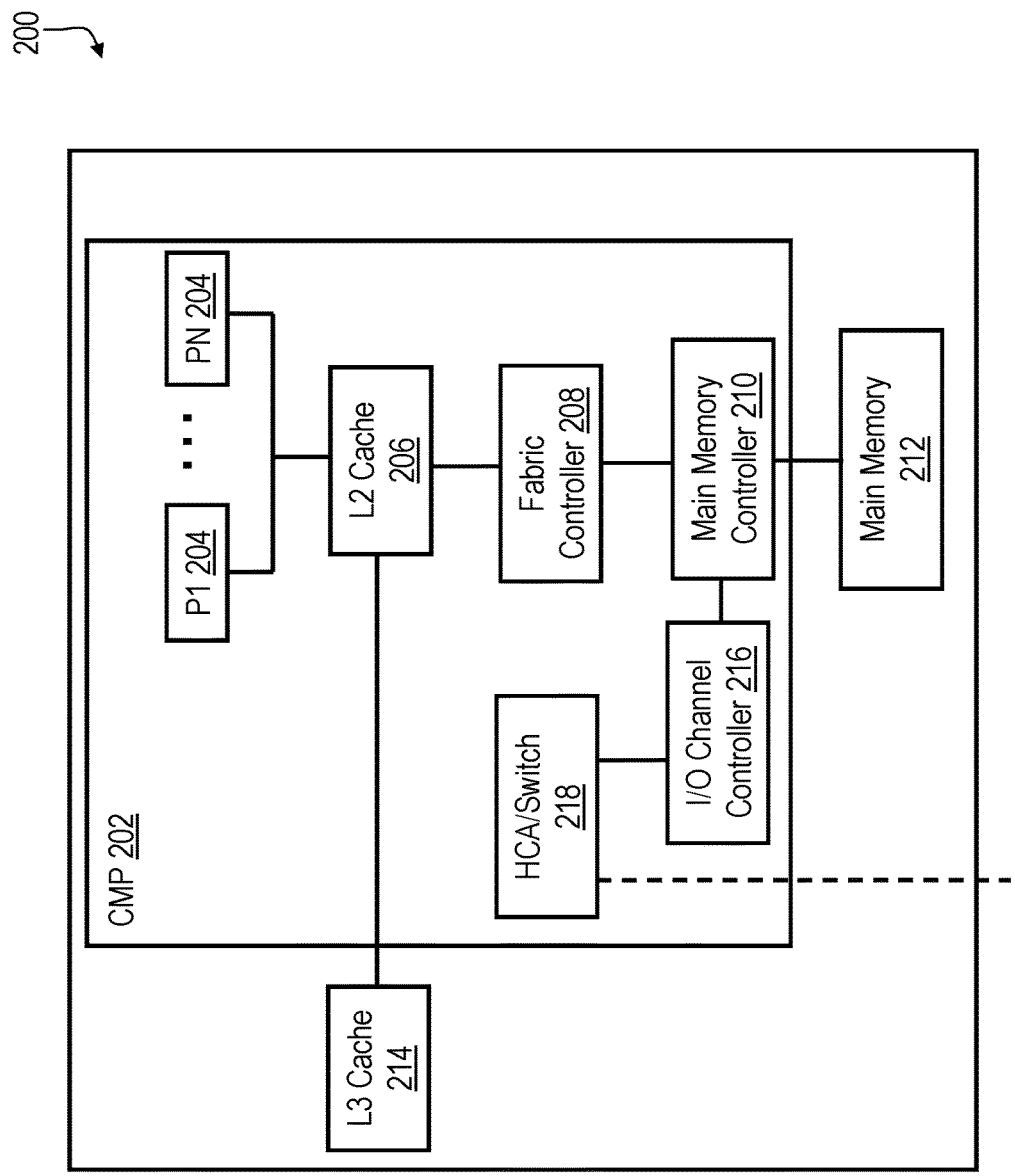
FIG. 2 is a diagram of a relevant portion of an exemplary symmetric multiprocessor (SMP) data processing system included in one of the nodes of FIG. 1, according to an embodiment of the present disclosure.

With reference to FIG. 2, each of the nodes N1-N18 of FIG. 1 may include a processor system, such as data processing system 200. As is illustrated, data processing system 200 includes one or more chip-level multiprocessors (CMPs) 202 (only one of which is illustrated in FIG. 2), each of which includes multiple (e.g., eight) processors 204. Processors 204 may, for example, operate in a simultaneous multithreading (SMT) mode or a single thread (ST) mode. When processors 204 operate in the SMT mode, processors 204 may employ multiple separate instruction fetch address registers to store program counters for multiple threads.

In at least one embodiment, processors 204 each include a first level (L1) cache (not separately shown in FIG. 2) that is coupled to a shared second level (L2) cache 206, which is in turn coupled to a shared third level (L3) cache 214. The L1, L2, and L3 caches may be combined instruction and data caches or correspond to separate instruction and data caches. In the illustrated embodiment, L2 cache 206 is further coupled to a fabric controller 208 that is coupled to a main memory controller (e.g., included in a Northbridge) 210, which supports a main memory subsystem 212 that, in various embodiments, includes an application appropriate amount of volatile and non-volatile memory. In alternative embodiments, fabric controller 208 may be omitted and, in this case, L2 cache 206 may be directly connected to main memory controller 210.

Fabric controller 208, when implemented, facilitates communication between different CMPs and between processors 204 and memory subsystem 212 and, in this manner, functions as an interface. As is further shown in FIG. 2, main memory controller 210 is also coupled to an I/O channel controller (e.g., included in a Southbridge) 216, which is coupled to a host channel adapter (HCA)/switch block 218. HCA/switch block 218 includes an HCA and one or more switches that may be utilized to couple CMP 202 to CMPs in other nodes (e.g., I/O subsystem nodes and processor nodes) of HPC cluster 100.

Figure 3:
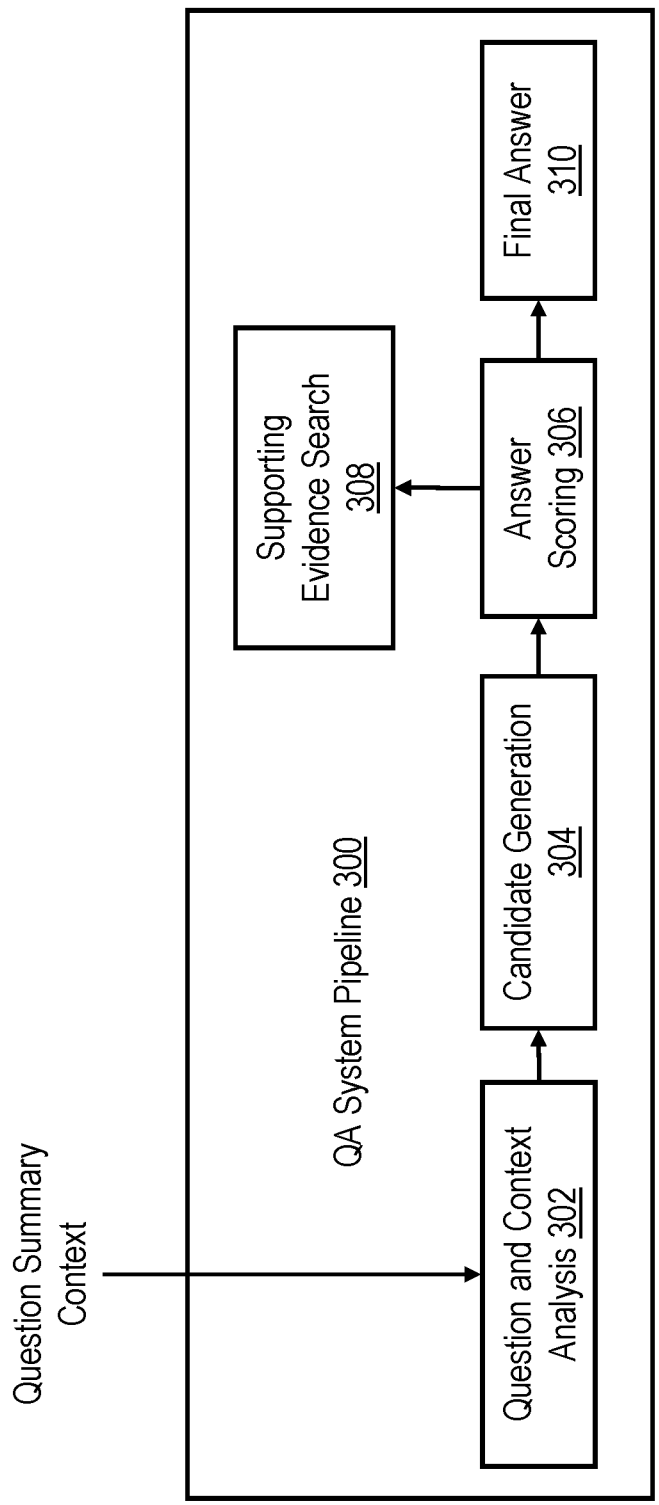
FIG. 3 depicts relevant components of an exemplary data processing system pipeline in the form of a question answering (QA) system pipeline.

FIG. 3 illustrates relevant components of a QA system pipeline for an exemplary QA system. As is illustrated in FIG. 3, a question and context analysis block 302 of QA system pipeline 300 receives a question (e.g., in the form of a question summary context) as an input and generates an output representing its analysis of the question and the context of the question. According to one embodiment of the present disclosure, question and context analysis block 302 is configured to identify an original subject of the question, modify the question to include one or more new subjects that are close to the original subject, and generate one or more additional outputs representing its analysis of the modified question and the context of the modified question.

A candidate generation block 304 of QA system pipeline 300 receives the outputs from question and context analysis block 302 at an input and generates candidate answers for the question (based on the original subject) and the modified question or questions (based on the new subject(s)). The candidate answers are provided to an input of an answer scoring block 306, which is configured to initiate a supporting evidence search (by supporting evidence search block 308) in order to score the various generated answers. The results of the answer scoring are provided to a final answer block 310, which is configured to provide a final answer to the question based on the scoring of the candidate answers. It should be appreciated that blocks 302-310 may be implemented in program code executing on one or more processor cores or may be directly implemented in dedicated hardware (logic).

Figure 4:
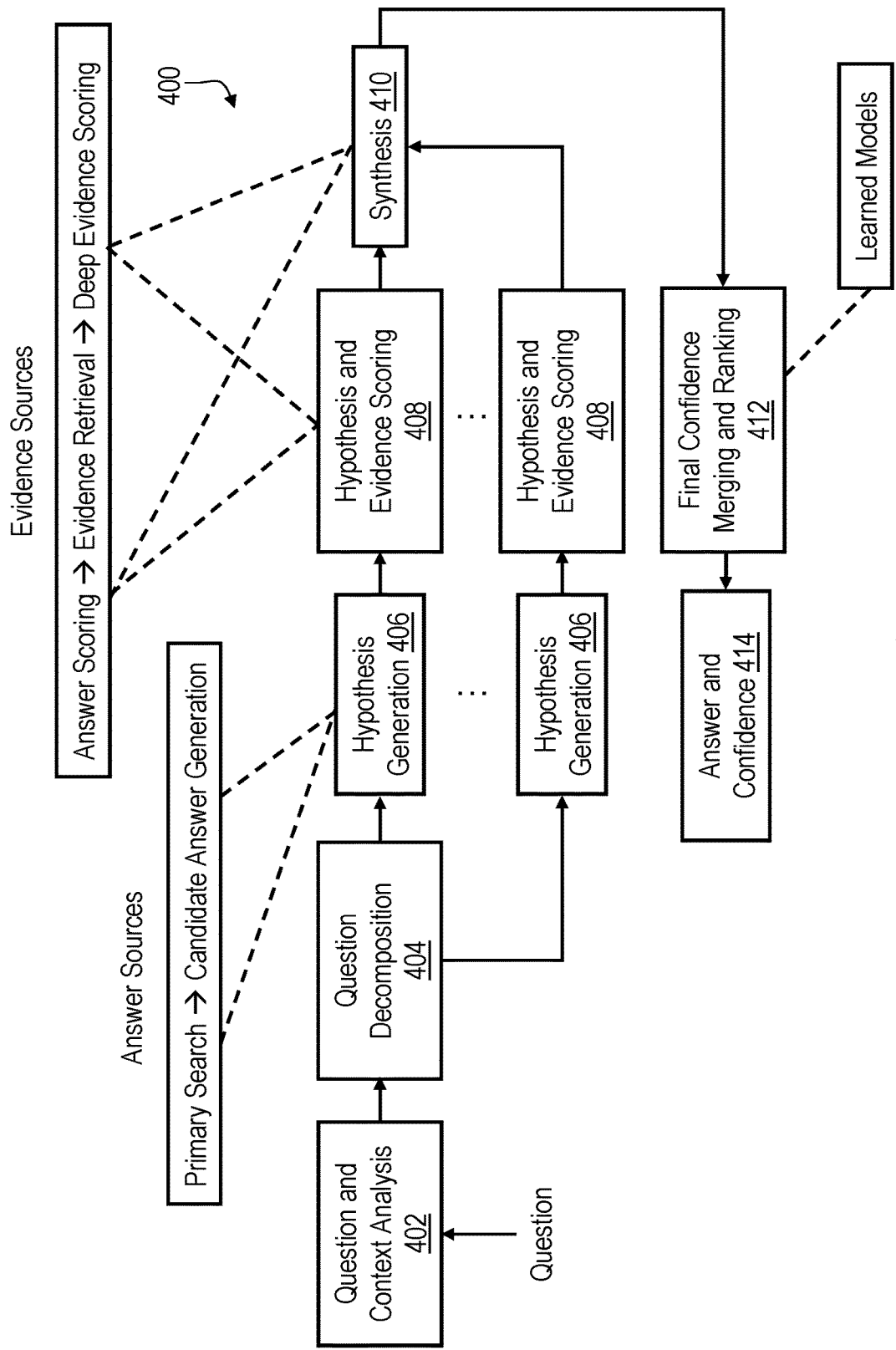
FIG. 4 depicts relevant components of the exemplary QA system pipeline of FIG. 3 in additional detail.

FIG. 4 illustrates relevant components of an exemplary QA system pipeline 400 in additional detail. As is illustrated, question and analysis context block 402 receives a question in a natural language. An output of block 402 is provided to a question decomposition block 404, which further analyzes the different textual, grammatical, linguistic, punctuation and/or other components of the question. In one or more embodiments, block 404 is also configured to identify an original subject of the question, modify the question to include one or more new subjects that are close to the original subject, and generate one or more additional outputs representing its analysis of the modified question and the context of the modified question. Block 404 provides inputs to multiple hypothesis generation blocks 406, which perform parallel hypothesis generation. Hypothesis generation blocks 406 each perform a primary search, collect reference data from different structured and unstructured sources, and generate candidate answers. For example, data generated by hypothesis 'i' may be referenced as 'D_i', and data generated by hypothesis 'j' may be referenced as 'D_j'. The data 'D_i' and 'D_j' may be the same data, completely different data, or may include overlapping data.

As one example, a QA system may be configured, according to the present disclosure, to: receive a question; create 'N' hypotheses (1 . . . N) to find candidate answers (e.g., N=10); and load data for each hypothesis 'i' on which to operate into a shared cache. For example, assuming a shared cache across all hypotheses, 1/Nth of the shared cache may be loaded with data for each hypothesis to operate on. The QA system may be further configured to execute the 'N' hypotheses to return 'M' candidate answers (in this case, each hypothesis generates one or more candidate answers). For example, the notation 'ANS_i' may be employed to denote a set of candidate answers generated by hypothesis 'i'. In various embodiments, hypothesis and evidence scoring for each hypothesis is initiated in hypothesis and evidence scoring blocks 408. That is, the QA system is further configured to score all the candidate answers using hypothesis and evidence scoring techniques (e.g., providing 'M' scores for 'M' candidate answers). In synthesis block 410 the QA system evaluates the candidate answers with the highest scores and determines which hypotheses generated the highest scores.

Following block 410, the QA system initiates final confidence merging and ranking in block 412. Finally, in block 414, the QA system provides an answer (and may provide a confidence score) to the question. Assuming, for example, the candidate answers 'j', 'k', and 'l' have the highest scores, a determination may then be made as to which of the hypotheses generated the best candidate answers. As one example, assume that hypotheses 'c' and 'd' generated the best candidate answers 'j', 'k', and 'l'. The QA system may then upload additional data required by hypotheses 'c' and 'd' into the cache and unload data used by other hypotheses from the cache. According to the present disclosure, the priority of what data is uploaded is relative to candidate scores (as such, hypotheses producing lower scores have less associated data in cache). When a new question is received, the above-described process is repeated. If the hypotheses 'c' and 'd' again produce best candidate answers, the QA system loads more data that is relevant to the hypotheses 'c' and 'd' into the cache and unloads other data.

If, on the other hand, hypotheses 'h' and 'g' produce the best candidate answers to the new question, the QA system loads more data relevant to the hypotheses 'h' and 'g' into the cache and unloads other data. It should be appreciated that, at this point, hypotheses 'c' and 'd' probably still have more data in the cache than other hypotheses, as more relevant data was previously loaded into the cache for the hypotheses 'c' and 'd'. According to the present disclosure, the overall process repeats in the above-described manner by basically maintaining data in the cache that answer and evidence scoring indicates is most useful. The disclosed process may be unique to a QA system when a cache controller is coupled directly to an answer and evidence scoring mechanism of a QA system.

As previously noted, the disclosed techniques are directed to determining a semantic distance between general subjects of information available via the Web. In or more embodiments, the disclosed techniques initially start with sets of topic vectors that are derived based on LDA analysis of training data. According to various embodiments of the present disclosure, a semantic distance between subjects is determined from topic vectors associated with the subjects. According to one embodiment, to determine a semantic distance between a first subject ('S1') and a second subject ('S2'), a dot product is performed on a set of 'n' topic vectors ('$T_{1n}$') of the first subject and a set of 'm' topic vectors ('$T_{2m}$') of the second subject. In one or more embodiments, a discrimination on a summation of the dot products is implemented such that if a given dot product is below a predetermined value (e.g., 0.05), the given dot product is set to zero. The predetermined value may be a tunable parameter and may be implemented such that noise associated with dot products near zero do not swamp relevant signals of stronger dot products.

According to at least one embodiment of the present disclosure, a semantic distance value is generated from a final sum of topic vector dot products by taking an inverse of the final sum. It should be appreciated that subjects with many words in common may have a relatively large final sum and correspondingly relatively small semantic distance value and, as such, are deemed closely related subjects. On the other hand, subjects with few or zero words in common will have a relatively small final sum and a correspondingly relatively large distance value (i.e., few words in common) or infinite distance value (i.e., no words in common) and, as such, are deemed non-related subjects. As one example, generated distance values may be utilized to populate a distance matrix (e.g., a 2000 by 2000 distance matrix) that indicates how close a given subject is to any other given subject. As one example, the disclosed techniques may be implemented by the exemplary equation set forth below:

$$\sum_{1}^{n}\sum_{1}^{m}[T_{1n}\cdot T_{2m}]_{if<l\to 0}$$

In the above equation $T_{1n}$ represents the 'n' topic vectors for a first subject and $T_{2m}$ represents the 'm' topic vectors for a second subject. As set forth in the above equation, if a dot product of topic vectors is less than a limit 'l', the dot product of the topic vectors is set equal to zero (if <l>0) to prevent noise from overwhelming relevant signals.

Figure 5:
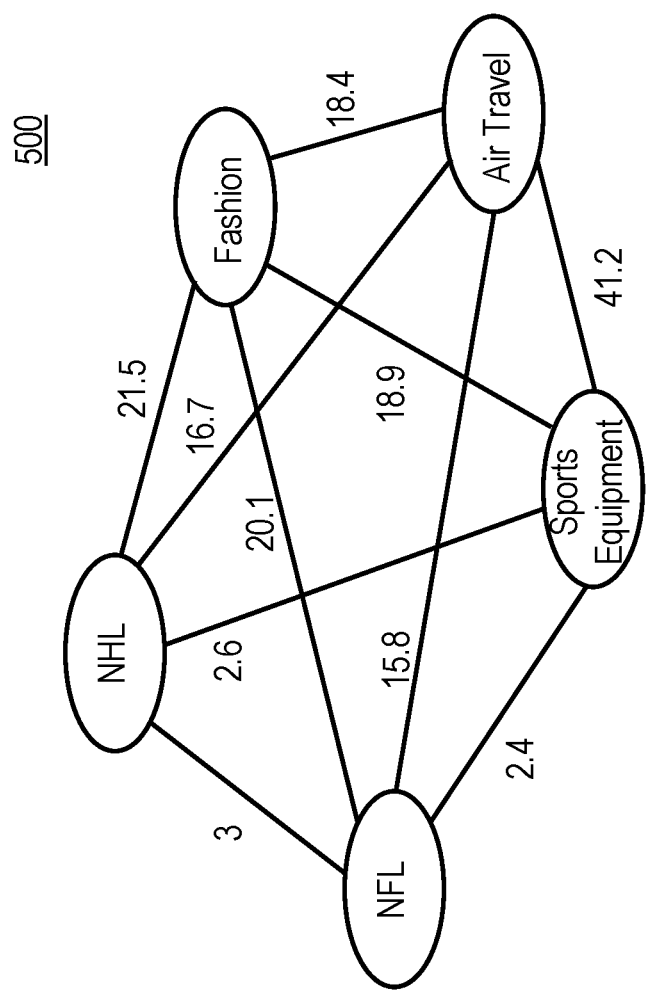
FIG. 5 is an exemplary diagram of a partial space of exemplary subjects with exemplary semantic distance values (semantic distances) between the subjects.

With reference to FIG. 5, a diagram 500 of a partial space of exemplary subjects with exemplary distance values between the subjects is illustrated, according to an embodiment of the present disclosure. Five exemplary subjects, i.e., 'NFL', 'NHL', 'sports equipment', 'fashion', and 'air travel', are illustrated in diagram 500 with a semantic distance between a given subject and another subject being represented numerically on a line between the two subjects. In diagram 500, a lower number indicates that subjects are semantically closer to each other and a higher number indicates that subjects are semantically farther from each other. As is illustrated, the subject 'NFL' is semantically closer to the subject 'sports equipment' than it is to the subjects, 'NHL', 'air travel', and 'fashion', as the semantic distance between the subjects 'NFL' and 'sports equipment' at '2.4' is less than '3', '15.8', and '20.1', respectively, for the other subjects. Assuming a threshold value of 3.5, the subjects 'sports equipment' and 'NHL' would also be utilized in a search for the subject 'NFL' to locate additional information that may, for example, be relevant in answering a question regarding the subject 'NFL'.

As is also illustrated, the subject 'NHL' is semantically closer to the subject 'sports equipment' than it is to the subjects, 'NFL', 'air travel', and 'fashion', as the semantic distance between the subjects 'NFL' and 'sports equipment' at '2.6' is less than '3', '16.7', and '21.5', respectively, for the other subjects. Assuming a threshold value of 5, the subjects 'sports equipment' and 'NFL' would also be utilized in a search for the subject 'NHL' to locate additional information that may, for example, be relevant in answering a question regarding the subject 'NHL'. As is further illustrated, the subject 'fashion' is semantically closer to the subject 'air travel' than it is to the subjects 'sports equipment', 'NFL', and 'NHL', as the semantic distance between the subjects 'fashion' and 'air travel' at '18.4' is less than '18.9', '20.1', and '21.5', respectively, for the other subjects. Assuming a threshold of 14, none of the other subjects would be utilized in a search for the subject 'fashion' to locate additional information that may, for example, be relevant in answering a question regarding the subject 'fashion'.

Figure 6:
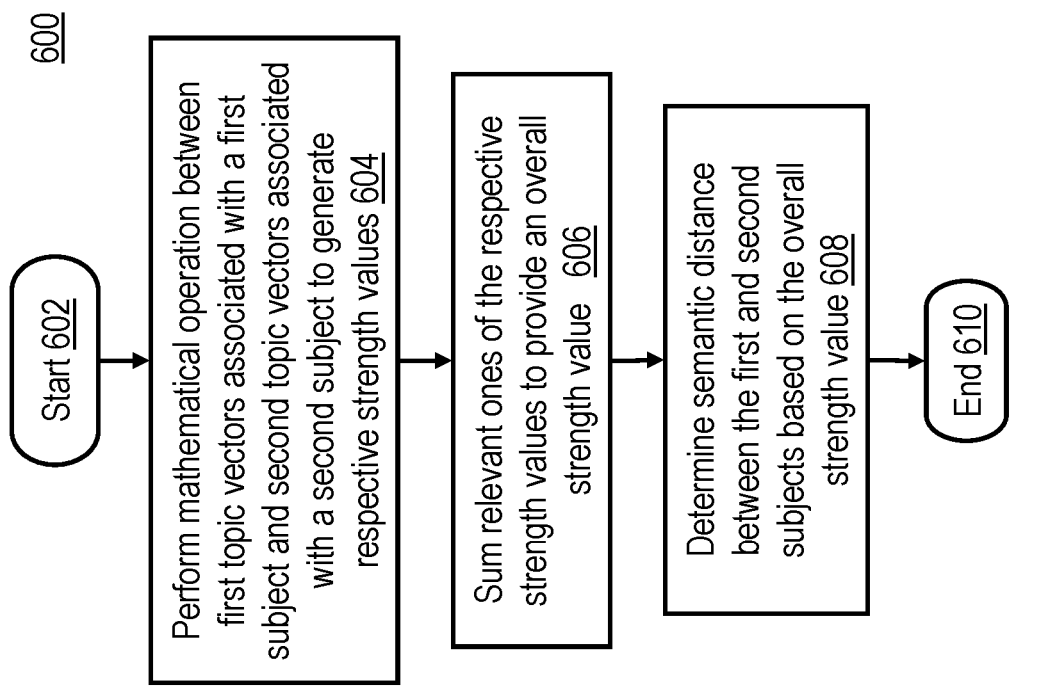
FIG. 6 is a flowchart of an exemplary process for calculating a semantic distance between subjects according to an embodiment of the present disclosure.

With reference to FIG. 6, a process 600 for determining a semantic distance between subjects is illustrated. Process 600 may, for example, be executed by one or more data processing systems 200 included within QA system pipeline 400. In block 602 process 600 is initiated by data processing system 200, e.g., in response to a user initiating a QA session by inputting a question. In various embodiments, questions are received in a natural language. Next, in block 604, data processing system 200 performs a mathematical operation (e.g., a dot product) between each of one or more first topic vectors and each of one or more second topic vectors to generate respective strength values. In one or more embodiments, the first topic vectors are associated with respective first topics of a first subject and the second topic vectors are associated with respective second topics of a second subject.

In one or more embodiments, the first topic vectors and the second topic vectors are generated using a statistical model analysis (e.g., a latent Dirichlet allocation (LDA) analysis). In various embodiments, each of the first and second topic vectors have an associated word and an associated strength value that is normalized to one. The number of the first topics for the first subject may, for example, be determined by taking the square root of a number of documents associated with the first subject divided by two. Similarly, the number of the second topics for the second subject may be determined by taking the square root of a number of documents associated with the second subject divided by two. The respective strength values, when summed, are indicative of a relative closeness between associated ones of the first and second topics.

Then, in block 606, data processing system 200 sums relevant ones of the respective strength values to provide an overall strength value between the first subject and the second subject. For example, a threshold may be employed to prevent noise from overwhelming relevant signals. As one example, strength values less than 0.05 may be discarded such that they are not included in the overall strength signal. It should be appreciated that the larger the overall strength signal the closer two subjects are to each other. Next, in block 608, data processing system 200 determines a semantic distance between the first subject and the second subject based on the overall strength value. In one or more embodiments, the semantic distance is determined by taking the inverse of the overall strength value. From block 608 control passes to block 610, where process 600 terminates until a user inputs a new question to QA system pipeline 400.

Figure 7:
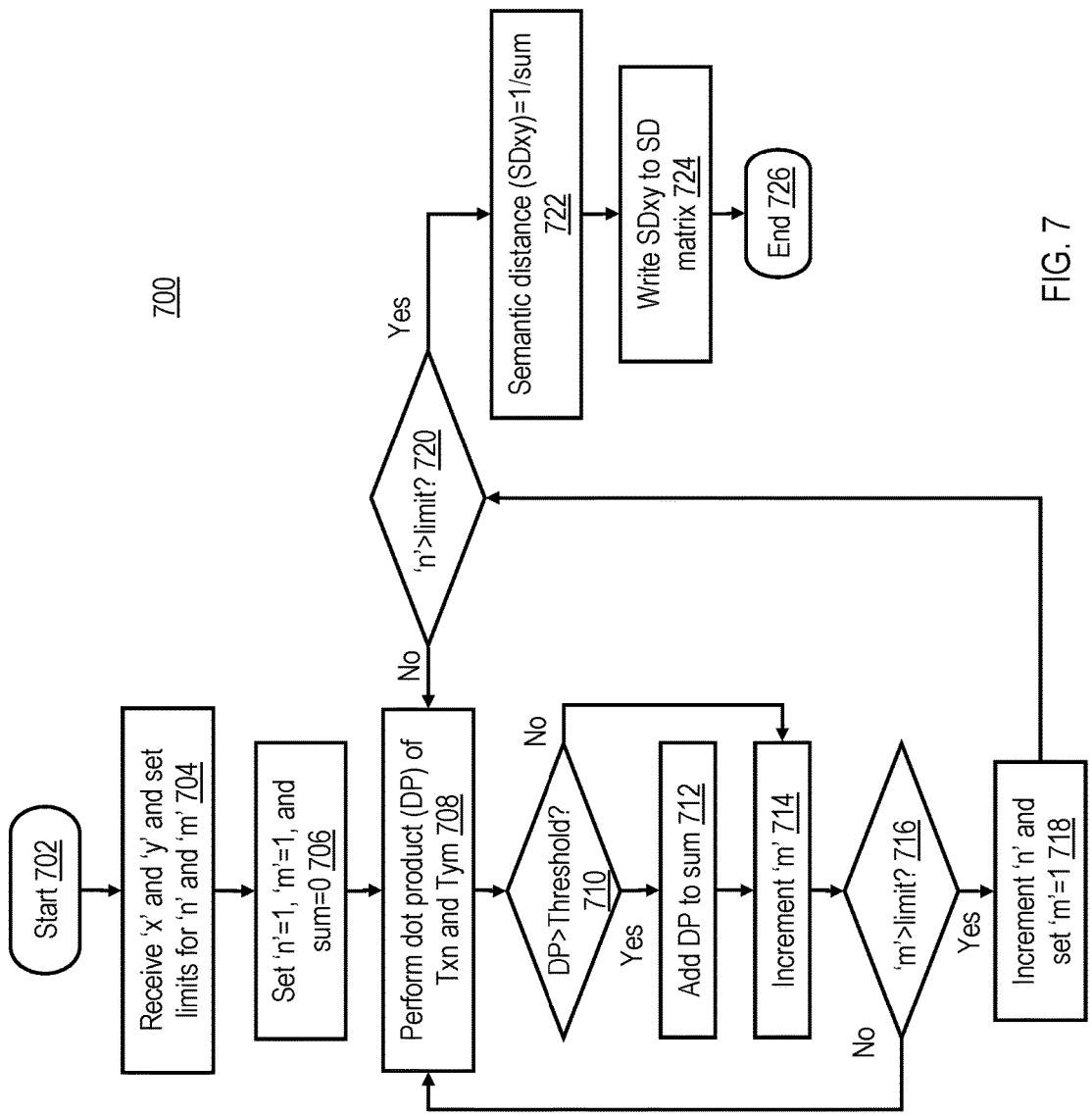
FIG. 7 is a flowchart of an exemplary process for calculating a semantic distance between subjects according to another embodiment of the present disclosure.

With reference to FIG. 7, a process 700, for determining a semantic distance (SD) between subjects is illustrated according to an embodiment of the present disclosure. Process 700 is configured to write the calculated SD into an appropriate entry in an SD matrix. It should be appreciated that writing SDs for multiple subjects into an SD matrix facilitates determining SDs via a lookup, as contrasted with having to recalculate an SD each time a question is received by a QA system. Process 700 may, for example, be executed by one or more data processing systems 200 included within QA system pipeline 400. In block 702 process 700 is initiated by data processing system 200, e.g., in response to a request to generate an SD matrix for a number of subjects. Next, in block 704, data processing system 200 receives a first designator 'x' for a first subject and a second designator 'y' for a second subject, as well as a limit for the variable 'n' for the first subject and a limit for the variable 'm' for the second subject. Limit 'n' designates the total number of topic vectors for the first subject and limit 'm' designates the number of topic vectors for the second subject. It should be appreciated that process 700 may be in executed parallel for each entry that is to be generated for the SD matrix. It should also be appreciated that topic vectors for each subject are assumed to be available for each subject on which process 700 is executed.

Next, in block 706, data processing system 200 initializes process 700 by setting 'n' equal to one, 'm' equal to one, and sum equal to zero. Then, in block 708, data processing system 200 calculates a dot product (DP) of Txn (i.e., a topic vector associated with the first subject) and Tym (i.e., a topic vector associated with the second subject). When block 708 is initially executed, a dot product of Tx1 and Ty1 is calculated. Next, in decision block 710, data processing system 200 determines whether the calculated DP for Tx1 and Ty1 is greater than a threshold value (e.g., 0.01). As previously noted, the threshold value is implemented to remove noise. In response to the calculated DP for Tx1 and Ty1 being greater than the threshold value in block 710 control transfers to block 712, where the calculated DP for Tx1 and Ty1 is added to a sum. Next, in block 714, data processing system 200 increments 'm' by one. In response to the calculated DP for Tx1 and Ty1 not being greater than the threshold value in block 710 control transfers directly to block 714.

Then, in decision block 716, data processing system 200 determines whether 'm' is greater than the limit previously set for 'm'. In response to 'm' not being greater than the limit previously set for 'm', control returns to block 708, where data processing system 200 then calculates a dot product (DP) of Tx1 (i.e., a first topic vector associated with the first subject) and Ty2 (i.e., a second topic vector associated with the second subject) the second time that block 708 executes. In response to 'm' being greater than the associated limit in block 716 control transfers to block 718. In block 718, data processing system 200 increments 'n' and sets 'm' equal to one. Next, in block 720, data processing system 200 determines whether 'n' is greater that the limit set for 'n' in block 704. In response to 'n' not being greater that the limit set for 'n' (in block 704) control transfers from block 720 to block 708 (where the dot product for Tx2 and Ty1 is calculated). In response to 'n' being greater that the limit set for 'n' (in block 704) control transfers from block 720 to block 722. In block 722 data processing system 200 calculates a semantic distance (SDxy) for subjects 'x' and 'y' by taking the inverse of the sum. Next, in block 724, data processing system 200 writes SDxy to an appropriate entry in the SD matrix. Following block 724, process 700 terminates in block 726.

Figure 8:
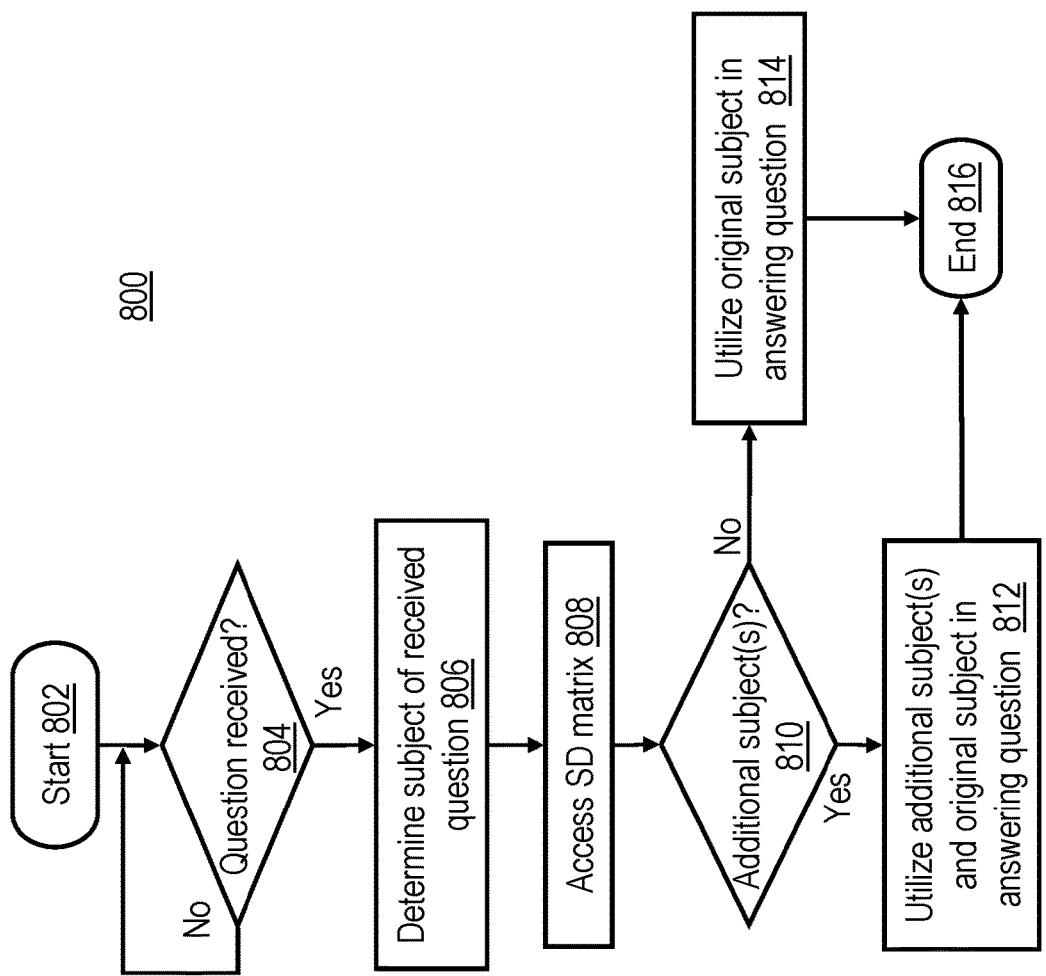
FIG. 8 is a flowchart of an exemplary process for utilizing a semantic distance between subjects to generate additional information for answering a received question, according to an embodiment of the present disclosure.

With reference to FIG. 8, a process 800, for determining whether additional subjects may be employed to locate additional information for answering a received question having an original subject, is illustrated. Process 800 may, for example, be executed by one or more data processing systems 200 included within QA system pipeline 400. In block 802 process 800 is initiated by data processing system 200, e.g., in response to user input. Next, in decision block 804, data processing system 200 determines whether the user input corresponds to a received question. In response to the user input not corresponding to a received question, control loops on block 804. In response to the user input corresponding to a received question control transfers from block 804 to block 806.

In block 806, data processing system 200 determines an original subject of the received question. Then, in block 808, data processing system 200 accesses an SD matrix to determine SDs between the original subject of the received question and other subjects represented in the SD matrix. Next, in decision block 810, data processing system 200 determines whether an SD between the original subject of the received question and any other subject is within a threshold value.

In response to the SD between the original subject of the received question and any other subjects being within a threshold value in block 810 control transfers to block 812. In block 812, data processing system 200 utilizes the additional subject or subjects and the original subject to retrieve information for answering the received question. From block 812 control transfers to block 816, where process 800 terminates. In response to the SD between the original subject of the received question and any other subjects not being within the threshold value in block 810 control transfers to block 814. In block 814, data processing system 200 only utilizes the original subject in answering the received question. From block 814 control transfers to block 816.

Accordingly, techniques have been disclosed herein that advantageously utilize a semantic distance between subjects to potentially improve the accuracy of a question answering system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer program product configured to determine a semantic distance between subjects, the computer program product comprising:
   a computer-readable storage device; and
   computer-readable program code embodied on the computer-readable storage device, wherein the computer-readable program code, when executed by a data processing system, causes the data processing system to:
   perform a mathematical operation between each of one or more first topic vectors and each of one or more second topic vectors to generate respective strength values, wherein the first topic vectors are associated with respective first topics of a first subject, the second topic vectors are associated with respective second topics of a second subject, and the respective strength values are indicative of a relative closeness between associated ones of the first and second topics;
   sum relevant ones of the respective strength values to provide an overall strength value between the first subject and the second subject;
   determine a semantic distance between the first subject and the second subject based on the overall strength value; and
   utilize both the first and second subjects in a search for information related to the first subject in response to the semantic distance being within a threshold distance value to improve the operation of the data processing system in answering a question about the first subject.

2. The computer program product of claim 1, wherein the computer-readable program code, when executed by the data processing system, further causes the data processing system to:
   generate the first topic vectors and the second topic vectors based on a statistical model analysis.

3. The computer program product of claim 2, wherein the mathematical operation is a dot product operation.

4. The computer program product of claim 2, wherein the statistical model analysis is a latent Dirichlet allocation (LDA) analysis.

5. The computer program product of claim 1, wherein a number of the first topics for the first subject is determined by taking the square root of a number of documents associated with the first subject divided by two.

6. The computer program product of claim 5, wherein the documents are located using a Web search.

7. The computer program product of claim 1, wherein the semantic distance between the first subject and the second subject is determined by taking an inverse of the overall strength value.

8. The computer program product of claim 1, wherein each of the first and second topic vectors have an associated word and an associated strength that is normalized to one.

9. A data processing system, comprising:
   a cache memory; and
   a processor coupled to the cache memory, wherein the processor is configured to:
   perform a mathematical operation between each of one or more first topic vectors and each of one or more second topic vectors to generate respective strength values, wherein the first topic vectors are associated with respective first topics of a first subject, the second topic vectors are associated with respective second topics of a second subject, and the respective strength values are indicative of a relative closeness between associated ones of the first and second topics;
   sum relevant ones of the respective strength values to provide an overall strength value between the first subject and the second subject;
   determine a semantic distance between the first subject and the second subject based on the overall strength value; and
   utilize both the first and second subjects in a search for information related to the first subject in response to the semantic distance being within a threshold distance value to improve the operation of the data processing system in answering a question about the first subject.

10. The data processing system of claim 9, wherein the processor is further configured to:
    generate the first topic vectors and the second topic vectors based on a statistical model analysis.

11. The data processing system of claim 10, wherein the mathematical operation is a dot product operation, the statistical model analysis is a latent Dirichlet allocation (LDA) analysis, and a number of the first topics for the first subject is determined by taking the square root of a number of documents associated with the first subject divided by two.

12. The data processing system of claim 9, wherein the semantic distance between the first subject and the second subject is determined by taking an inverse of the overall strength value.

\* \* \* \* \*